US008949436B2

(12) United States Patent
Rimac et al.

(10) Patent No.: US 8,949,436 B2
(45) Date of Patent: Feb. 3, 2015

(54) SYSTEM AND METHOD FOR CONTROLLING PEER-TO-PEER CONNECTIONS

(75) Inventors: Ivica Rimac, Tinton Falls, NJ (US); Volker F. Hilt, Middletown, NJ (US); Nazanin Magharei, Eugene, OR (US)

(73) Assignee: Alcatel Lucent, Boulogne-Billancourt (FR)

( * ) Notice: Subject to any disclaimer, the term of this patent is extended or adjusted under 35 U.S.C. 154(b) by 1014 days.

(21) Appl. No.: 12/641,429

(22) Filed: Dec. 18, 2009

(65) Prior Publication Data
US 2011/0153835 A1 Jun. 23, 2011

(51) Int. Cl.
*G06F 15/16* (2006.01)
*H04L 29/08* (2006.01)

(52) U.S. Cl.
CPC .......... *H04L 67/104* (2013.01); *H04L 67/1063* (2013.01); *H04L 67/1093* (2013.01); *H04L 67/1051* (2013.01); *H04L 67/1059* (2013.01); *H04L 67/108* (2013.01)
USPC ............................ 709/227; 709/228; 709/229

(58) Field of Classification Search
CPC . H04L 67/104; H04L 67/108; H04L 67/1051; H04L 67/1059; H04L 67/1093; H04L 67/1063
USPC ....................................................... 709/227
See application file for complete search history.

(56) References Cited

U.S. PATENT DOCUMENTS

| 7,644,167 | B2 * | 1/2010 | Lee et al. | 709/229 |
| 7,856,017 | B2 * | 12/2010 | Damola et al. | 370/389 |
| 2003/0236745 | A1 * | 12/2003 | Hartsell et al. | 705/40 |
| 2004/0047293 | A1 * | 3/2004 | Arrakoski | 370/236 |
| 2005/0105905 | A1 * | 5/2005 | Ovadia et al. | 398/47 |
| 2005/0215196 | A1 * | 9/2005 | Krishnan et al. | 455/41.2 |
| 2008/0133723 | A1 * | 6/2008 | Lee et al. | 709/222 |
| 2008/0155061 | A1 * | 6/2008 | Afergan et al. | 709/218 |
| 2009/0006563 | A1 | 1/2009 | Lev | |
| 2009/0276540 | A1 * | 11/2009 | Ahn et al. | 709/243 |
| 2010/0138552 | A1 * | 6/2010 | Oh et al. | 709/229 |
| 2010/0161795 | A1 * | 6/2010 | Deridder et al. | 709/224 |
| 2010/0177631 | A1 * | 7/2010 | Chen et al. | 370/221 |

OTHER PUBLICATIONS

Mohamed M. Hefeeda et al., A hybrid architecture for cost-effective on-demand media streaming, Oct. 2003, www.elsevier.com/locate/comnet, Purdue University, pp. 360-366.*
International Search Report dated Feb. 23, 2011, in corresponding International Application No. PCT/US2010/057706.

(Continued)

*Primary Examiner* — Joseph Greene
(74) *Attorney, Agent, or Firm* — Harness, Dickey & Pierce (57) ABSTRACT

The present invention relates to a system and method for controlling peer-to-peer connections in a Peer-to-Peer (P2P) streaming application for individual Internet Service Provider (ISP) networks over a localized overlay. The system may include a tracker local to a first ISP network configured to select edge peers among local peers of the first ISP network. The selected edge peers have external connections to peers outside the first ISP network in order to transfer substreams to or from the first ISP network, and the local peers not selected as edge peers have internal connections to other local peers within the first ISP network to transfer the substreams over the localized overlay.

20 Claims, 5 Drawing Sheets

(56) References Cited

OTHER PUBLICATIONS

Mohamed M. Hefeeda, et al. "A hybrid architecture for cost-effective on-demand media streaming." Department of Computer Sciences, Purdue University, West Lafayette, IN 47907, USA. Computer Networks 44 (2004), pp. 353-382.

Chinese Office Action dated Apr. 24, 2014 in corresponding application No. 201080057574.2 with translation.

* cited by examiner

SYSTEM AND METHOD FOR CONTROLLING PEER-TO-PEER CONNECTIONS

BACKGROUND

Peer-to-Peer (P2P) streaming applications use diverse connectivity between participants in a network and cumulative bandwidth of network participants rather than conventional centralized resources where a relatively low number of servers provide the core value to a service or application. P2P applications are typically used for sharing content files containing content such as audio, video, and/or digital data, for example, over the internet. In addition, P2P streaming applications have been widely used for scalable streaming of live multimedia over the internet. In P2P streaming, participating peers form an overlay and deliver the content on top of the overlay.

Figure 1:
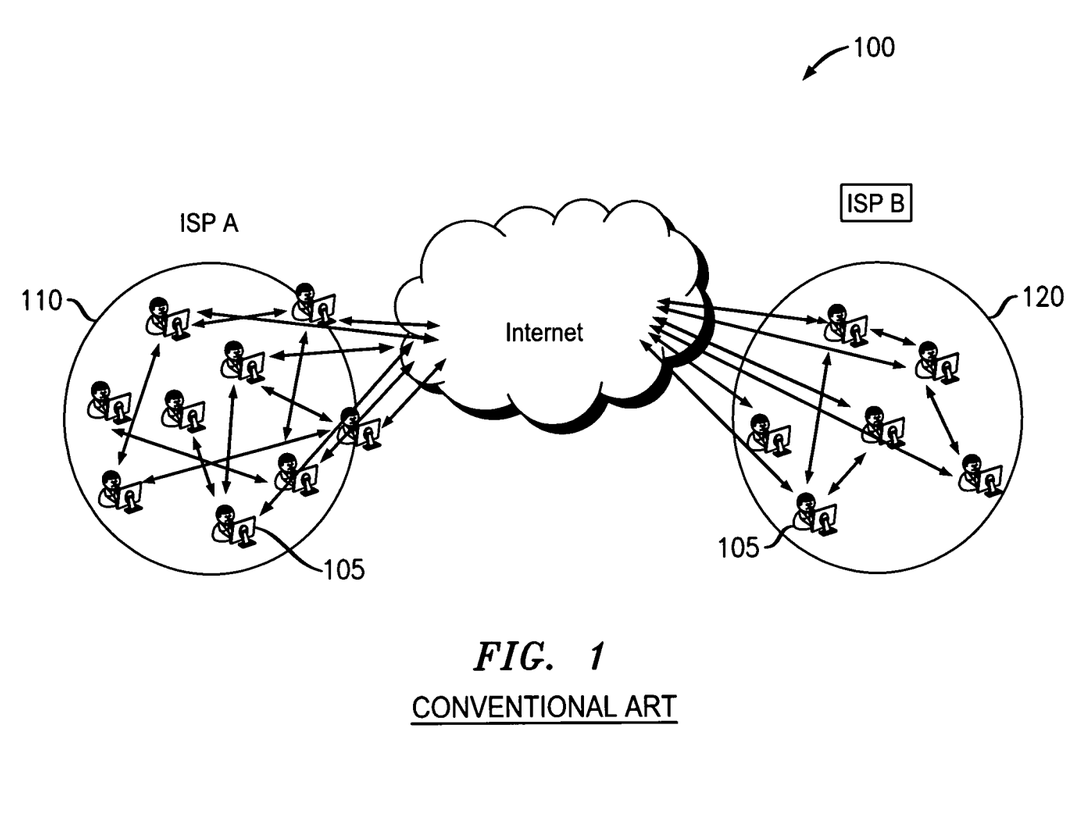
FIG. 1 illustrates a conventional overlay showing random connection.

Conventional live P2P streaming applications use random connected overlays among participating peers. For example, FIG. 1 illustrates conventional overlays that include random connections. Referring to FIG. 1, a conventional system 100 within a P2P streaming application may include peers 105 in an Internet Service Provider (ISP) network A (ISP A) and an ISP network B (ISP B) that are randomly connected. For example, one of the peers 105 in the ISP A 110 may connect to another peer in the ISP A 110 (e.g., internal) or connect to one of the peers 105 in ISP B 120 (external). Because the connections among peers 105 are random, the connections may be either internal connections or inter-ISP connections (or external connections). The terms inter-ISP connections and external connections are inter-changeable terms. However, costs for inter-ISP connections are usually greater than internal connections. Because the random overlay system uses a significant amount of inter-ISP connections, the cost for implementing such a system may be relatively high.

To reduce inter-ISP connections among peers 105, conventional approaches have focused on localization of overlay connectivity within each ISP network. P2P localization enables individual ISP networks to control the selection of neighbor peers while considering their policies and business relationships with other ISP networks in order to manage and reduce traffic over inter-ISP connections.

One type of method for localization uses an oracle that directs the local peer to use a selected number of peers. For example, a new local peer may contact a P2P bootstrap node of the P2P application to receive a list of candidate peers (or potential neighbors) participating in the underlay. Next, the local peer transmits the list of candidate peers to an oracle associated with the local peer. The oracle applies connection preferences by sorting the list of candidate peers and returns the sorted list back to the local peer. The local peer uses the sorted list for initiating connections to preferred neighbors. In this method, the ISP has some control over which peers the local peer is attempting to connect. However, localizing P2P traffic potentially can affect the performance of P2P applications by decreasing the diversity of content in each neighborhood of the local peer.

Another type of localization uses file swarming mechanisms over localized overlays. In the swarm-based approach, video data is divided into multiple sub-streams, and the participating peers are organized into a random mesh overlay, where swarming is used for the delivery of each sub-stream. A parent-child relationship exists between connected peers. Each peer as a parent notifies children peers of the availability of sub-streams. To effectively utilize access link bandwidth of participating peers, incoming and outgoing degrees of peers should be proportional to the incoming and outgoing bandwidth. This implies that all connections have approximately the same average bandwidth. Swarming content delivery combines push content reporting by parent peers with pull content requesting by children peers. Each peer simultaneously receives content from all of its parent peers and provides content to all of its children peers. Parent peers progressively report the availability of their new sub-streams to all of the children peers. Given the available sub-streams among the parent peers, each peer periodically invokes a block scheduling scheme to determine which blocks should be pulled from each parent peer in order to maximize the utilization of bandwidth and the delivered quality.

However, conventional embodiments of the swarm-based approach take advantage of the relaxed timing constrains of file delivery applications, which have a single requirement only, that is, the delivery of all segments. As a result, studies have demonstrated that playout of live video streams is dramatically increased and the claim of "live streaming" becomes questionable (e.g., tens of seconds, even minutes for larger swarms).

SUMMARY

The present invention relates to a system and method for controlling peer-to-peer connections in a Peer-to-Peer (P2P) streaming application for individual Internet Service Provider (ISP) networks over a localized overlay.

The system may include a tracker local to a first ISP network configured to select edge peers among local peers of the first ISP network. The selected edge peers have external connections to peers outside the first ISP network in order to transfer sub-streams to or from the first ISP network, and the local peers not selected as edge peers have internal connections to other local peers within the first ISP network to transfer the sub-streams over the localized overlay. The tracker may select the edge peers based on bandwidth. Further, the tracker may select an edge peer when an existing edge peer departs from the P2P streaming application. Alternatively, the tracker may select an edge peer based on whether a number of edge peers is below a first threshold.

In another embodiment, the tracker is configured to select edge peers of a first type and edge peers of a second type. The edge peers of the first type manage incoming external connections and the edge peers of the second type manage outgoing external connections.

The system further includes a session-level tracker configured to provide a list of potential external peers to the edge peers to establish the external connections in response to an announce message from the edge peers. The edge peers are the only local peers visible to external peers outside the first ISP network. Also, the session-level tracker may be further configured to provide a list of local trackers.

In one embodiment, the tracker is configured to schedule the transfer of the sub-streams via the external connections between the external peers and the edge peers of the first ISP network. The tracker schedules the transfer of the sub-streams based on available sub-streams at the external peers and an ISP Hop Count (ICH) for each sub-stream. The ICH indicates a number of ISP networks that a sub-stream traversed.

The local peers of the first ISP network schedule the transfer of the sub-streams via the internal connections based on available sub-streams at internal parent peers and a Peer Hop Count (PHC). The PHC indicates a number of internal peers that a respective sub-stream traversed within a single ISP network. The local peers schedule the transfer of sub-streams which have a minimum PHC count value.

Each sub-stream includes: (1) ISP Hop Count (ICH) indicating a number of ISP networks that a respective sub-stream traversed, (2) Peer Hop Count (PHC) indicating a number of internal peers that a respective sub-stream traversed within a single ISP network, and (3) Overall Hop Count (OHC) indicating a total number of peers that a respective sub-stream traversed regardless of an ISP network.

The method includes selecting, by a tracker local to a first ISP network, edge peers among local peers of the first ISP network. The selected edge peers have external connections to peers outside the first ISP network in order to transfer sub-streams to or from the first ISP network, and the local peers not selected as edge peers have internal connections to other local peers within the first ISP network to transfer the sub-streams over the localized overlay. The selecting step selects the edge peers based on bandwidth. Further, the selecting step selects an edge peer when an existing edge peer departs from the P2P streaming application. Alternatively, the selecting step selects an edge peer based on whether a number of edge peers is below a first threshold.

In another embodiment, the selecting step selects edge peers of a first type and edge peers of a second type. The edge peers of the first type manage incoming external connections and the edge peers of the second type manage outgoing external connections.

The method further includes providing, by a session-level tracker, a list of potential external peers to the edge peers to establish the external connections in response to an announce message from the edge peers. The method further includes scheduling, by the tracker, the transfer of the sub-streams via the external connections between the external peers and the edge peers of the first ISP network. The scheduling step schedules the transfer of the sub-streams based on available sub-streams at the external peers and an ISP Hop Count (ICH) for each sub-stream. The ICH indicates a number of ISP networks that a sub-stream traversed.

The method further includes scheduling, by the local peers of the first ISP network, the transfer of the sub-streams via the internal connections based on available sub-streams at internal parent peers and a Peer Hop Count (PHC). The PHC indicates a number of internal peers that a respective sub-stream traversed within a single ISP network.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION OF EXAMPLE EMBODIMENTS

Various embodiments of the present invention will now be described more fully with reference to the accompanying drawings in which some embodiments of the invention are shown. Like numbers refer to like elements throughout the description of the figures.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "selecting" or "providing" or "determining" or "managing" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Example embodiments of the present invention relate to a system and method for controlling peer-to-peer connections in a Peer-to-Peer (P2P) streaming application for individual Internet Service Provider (ISP) networks over a localized overlay. The embodiments of the present invention effectively control external traffic of individual ISP networks by limiting the number of external connections and revising the scheduling scheme for the swarm-based approach to deliver, for example, quality video streaming. In contrast, the basic assumption in overlay localization is that peers do not have any preference in selecting parent peers as long as the peers can identify a proper number of parent peers. By directing peers in the same ISP network to discover and connect to other peers in the same ISP network, the number of external (incoming and outgoing) connections for each ISP network can be reduced, which in turn proportionally reduces the external traffic (e.g., cost) associated with a P2P application.

Figure 2:
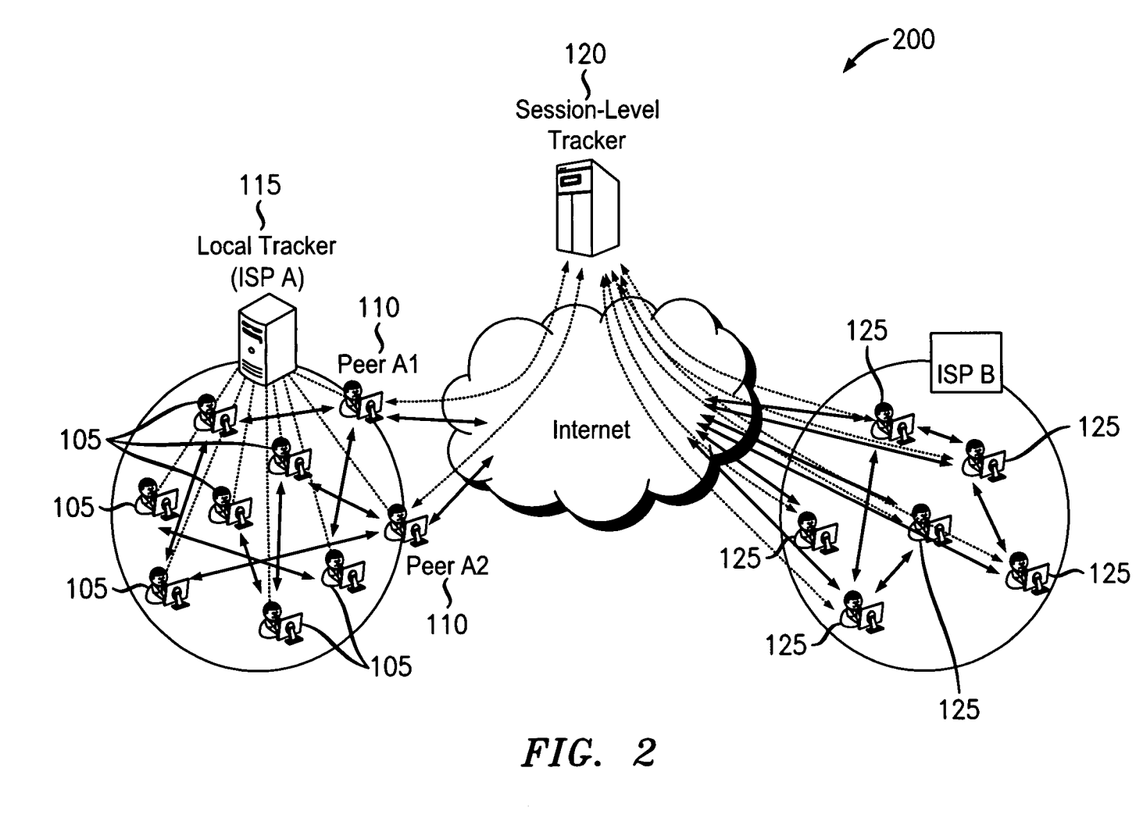
FIG. 2 illustrates a system for controlling peer-to-peer connections according to an embodiment of the present invention.

FIG. 2 illustrates a system 200 for controlling P2P connections in a P2P streaming application for individual ISP networks according to an embodiment of the present invention. The system 200 in FIG. 2 illustrates two ISP networks, ISP A and ISP B, a session-level tracker 120 that discovers external peers for inter-ISP connections, peers 105 in ISP A, and peers 125 in ISP B, which are connected via the internet in a P2P streaming application. P2P streaming applications are used for sharing, among peers, content files containing content such as audio, video, and/or or digital data over the internet. In addition, P2P streaming applications are used for streaming of live multimedia over the Internet.

Peers 105 and peers 125 may be any type of system configured to operate a P2P application such as a personal computer, wireless phone or any other similar device. Peers 105 are local to ISP A, and peers 125 are local to ISP B. Peers that are local to an ISP network may be referred to as local peers. Although FIG. 2 illustrates a finite number of peers, the number of peers in an ISP continuously varies depending on the traffic associated with a P2P application. In addition, ISP A includes edge peers 110, which are also peers 105 local to ISP A, but have been selected as edge peers as explained below.

ISP A includes a local tracker 115, to which peers local to ISP A (e.g., peers 105 and 110) joining the P2P network announce themselves. The connections between the local tracker 115 and each peer 105 and 110 are illustrated by the dotted connection lines between the local tracker 115 and each peer 105 and 110. As a response, the local tracker 115 returns a list of candidate peers to each peer 105 and 110 for potential connections. In addition, the local tracker 115 is configured to determine a total number of incoming and outgoing external connections for ISP A and to ensure that the aggregate incoming bandwidth equals at least the stream bandwidth.

In ISP A, the solid lines among local peers 105 and 110 illustrate the transfer of P2P data (internally). Also, the solid lines from the internet to edge peers 110 illustrate the transfer to P2P data with an outside source such as an external peer or a content provider (externally), which is further explained below. Similarly, in ISP B, the solid lines illustrate the transfer of P2P data. However, in ISP B, each peer 125 transfers P2P internally and externally. As a result, P2P external control is required for all of the external connections of peers 125 in ISP B (as shown by the dotted lines with arrows), while P2P external control is only required for connections of edge peers 110 in ISP A (as shown by the dotted lines with arrows).

Although only two ISP networks are illustrated in FIG. 2, example embodiments of the present invention cover any number of ISP networks. In contrast to ISP A, ISP B does not use localization. Rather, all peers 125 in ISP B contact the session-level tracker 120 for external connections to peers 105 in ISP A. Although the P2P network in ISP B in FIG. 2 is illustrated as an ISP without localization, ISP B may include localization. In other words, the local tracker 115 may control external connection to peers outside the ISP A network, which are apart of an ISP network that includes localization or does not include localization (as shown in FIG. 2).

Figure 3:
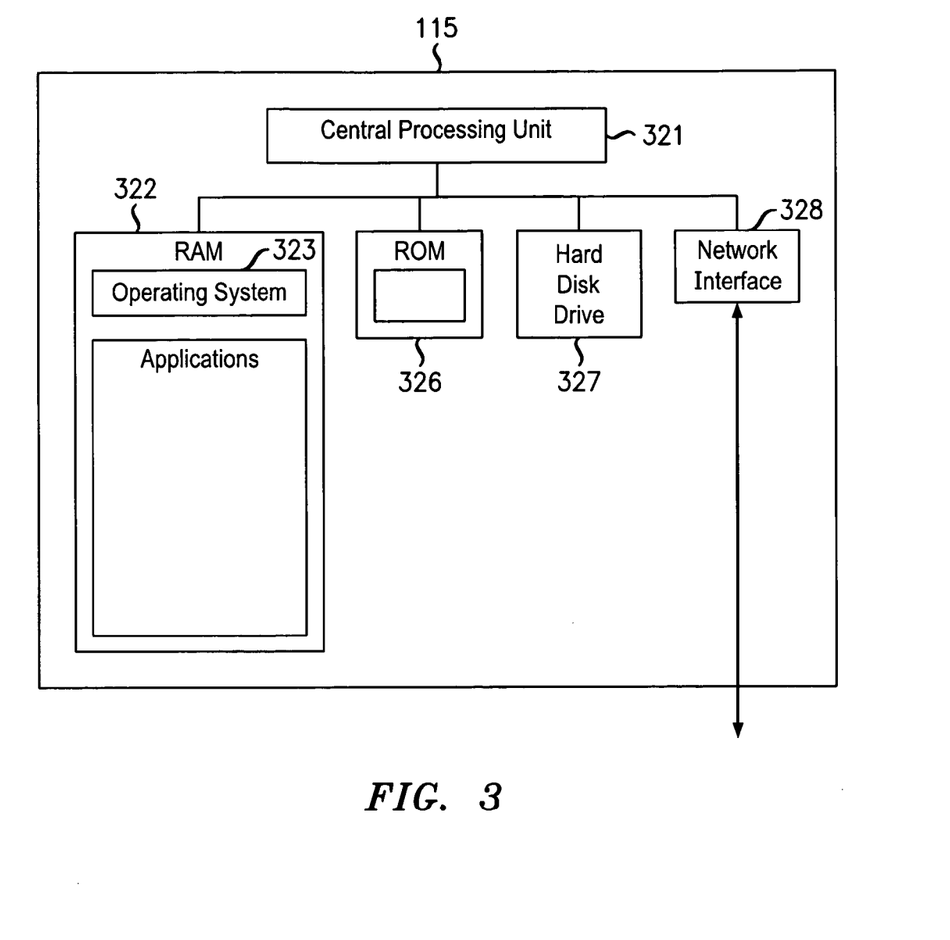
FIG. 3 illustrates an example of the structure of the local tracker according to an embodiment of the present invention.

FIG. 3 illustrates an example of the structure of the local tracker 115 according to an embodiment of the present invention. The local tracker 115 includes a central processing unit (CPU) 321, random access memory (RAM) 322, read only memory (ROM) 326, a hard disk drive 327, and a network interface 328. The local tracker 115 may also include other components other than shown on FIG. 3 that are well known to one skilled in the art. The CPU 321, the RAM 322, the ROM 326, the hard disk drive 327, and the network interface 328 communicate with each other via a bus. The hard disk drive 327 operates in a manner which is well known to one skilled in the art.

The RAM 422 may store an operating system 323 providing instructions for the CPU 321 to carry out operations of the local tracker 115. Any general-purpose operating system may be employed. The network interface unit 328 allows the CPU 321 to communicate with the Internet, or some other communications network, which are constructed for use with various communication protocols including the TCP/IP protocol. The network interface unit 328 may include transceiver(s), transceiving device(s), and/or network interface card(s) (NICs), for example. The network interface unit 328 is configured to communication with the internet, peers 105, 110, and 125, the session-level tracker 120, as well as any other device for performance of the functions of the local tracker 115.

Also, the RAM 322 may include one or more data storage units, which can be utilized by the local tracker 115 to store, among other things, applications, as well as database information, for example. For instance, the RAM 322 may store applications necessary to perform the functions of the local tracker 115, which are described below.

Figure 4A:
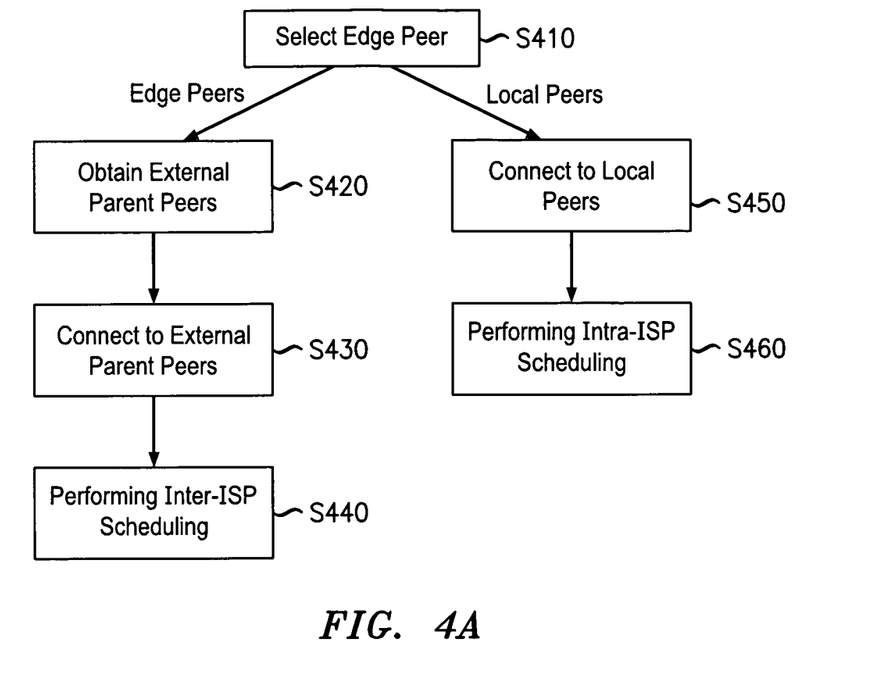
FIG. 4A illustrates a flow diagram for controlling peer-to-peer connections according to a two-tier scheduling scheme according to an embodiment of the present invention.

FIG. 4A illustrates a flow diagram for controlling peer-to-peer connections according to a two tier scheduling scheme according to an embodiment of the present invention. The local tracker 115 controls external traffic of ISP A by limiting the number of external connections.

In particular, referring to S410, the local tracker 115 is configured to select edge peers 110, Peer A1 and Peer A2, among the local peers of the ISP A. The selected edge peers 110 maintain the external connections to peers outside the ISP A network (e.g., peers 125) in order to deliver sub-streams of the video stream to the ISP A, while the local peers of ISP A maintain internal connections to other local peers within ISP A to deliver the sub-streams over the localized overlay of ISP A. In other words, edge peers 110 have external connections and peers internal to ISP A (e.g., peers 105) do not have external connections. The selection decision made by the local tracker 115 may be based on the bandwidth of the edge peer 110. For instance, peers local to ISP A with a relatively higher bandwidth are preferred to be selected as edge peers 110. However, the selection decision is not limited to only bandwidth of potential edge peers where other types of criteria may be used as a basis for making such a selection decision. For purposes of this invention, the local tracker 115 selects less than all of the peers local to ISP A as edge peers 110. The number of edge peers can be any integer greater or equal to 1, which is less than the total number of peers local to ISP A. In addition, once an edge peer departs from the P2P application, the local tracker 115 may select another peer local to ISP A as an edge peer based on bandwidth or any other criteria explained above.

In another embodiment, local tracker 115 is configured to determine a number of edge peers within an ISP network and select an edge peer based on whether the number of edge peers is below a first threshold. The first threshold may be a desired (or alternatively, a predetermined) number of peers. The desired number of peers may be any number of peers such as 1 or any integer greater than 1.

In another embodiment, the local tracker 115 tracks local peers and status of the local peers as either regular peers or edge peers. For example, when a new peer joins the P2P application in ISP A, the local tracker 115 transmits the number of edge peers and local peers to the new peer. The newly joined peer decides to become an edge peer based on the number of edge peers reported by the local tracker 115. For example, if the number of edge peers is below the first threshold, the peer becomes an edge peer.

Once the edge peers 110 are selected, the edge peers 110 obtain external parent peers (S420), connect to external peers (S430), and start exchanging content information according to an inter-ISP scheduling mechanism (S440), as discussed below. Also, the local peers (e.g., peers 105 and 110) connect to other local peers within the ISP A network (S450), and start exchanging content information according to an intra-ISP scheduling mechanism (S460). The classification of peers of the ISP A network into either edge peers 110 or local peers 105 over a localized overlay provides a two tier scheduling mechanism for delivery of, for example, the video stream, which is performed according to intra-ISP scheduling and inter-ISP scheduling. Although the flowchart of FIG. 4A illustrates a sequence of steps, these steps may occur out of order and at the same time. For instance, typically intra-ISP scheduling is performed at the same time as inter-ISP scheduling.

In S420, the session-level tracker 120 is configured to provide a list of potential external peers (e.g., peers 125 in ISP B) to establish the external connections in response to an announce message from the edge peers 110. In other words, the edge peers 110 discover external peers (e.g., peers 125 in ISP B) through the session-level tracker 120. The edge peers 110 signal the session-level tracker 120 through an announce message and in return receive a list of potential external peers. Based on the list of potential external peers, the edge peers 110 connect to a sub-set of external peers (S430). Because only the selected edge peers 110 announce themselves to the session-level tracker 120, the edge peers 110 are the only local peers visible to external peers outside the ISP A network (e.g., peers 125 in ISP B). Therefore, no other peers than the edge peers 110 will receive incoming cross-ISP connection requests, which effectively limits and controls the number of incoming connections.

In another embodiment, the local tracker 115 is configured to select two different classes of edge peers 110 to differentiate between external incoming and outgoing connection requests. For instance, the local tracker 115 selects edge peers of a first type that manage incoming external connection requests and edge peers of a second type that manage outgoing external connection requests. The first type of edge peers selected by the local tracker 115 are responsible for accepting incoming connections from peers outside the ISP A network (e.g., peers 125) and serving the peers outside the ISP A network as parent peers. The second type of edge peers are responsible for connecting to external parent peers for bringing the content information to the ISP A network (e.g. local peers 105 and 110) from the external parent peers.

In one embodiment, the first type of edge peer announces itself to the session-level tracker 120, thus, making the first type of edge peer visible to the external peers. The second type of edge peer contacts the session-level tracker 120 and requests a list of the first type of edge peers from other ISP networks.

In another embodiment, no peers from a localization-enabled ISP network (e.g., ISP A) announce themselves to the session-level tracker 120. Instead, the local tracker 115 of ISP A and local trackers of other localization-enabled ISP networks announce themselves to the session-level tracker 120. When an external edge peer (or a regular peer in a non-localized ISP network—e.g., from ISP B) contacts the session-level tracker 115, the external edge peer or regular peer identifies local trackers in the session-level tracker's response to its request. For example, if the list of local trackers included local tracker 115 of the ISP A network, the requesting peer from ISP B would subsequently contact local tracker 115 of ISP A. The local tracker 115 would then redirect/forward the request to a randomly chosen/a priori selected local peer if the number of outgoing connections is below a threshold. In this case, the external peer connects to the local peer, which effectively becomes an edge peer of the second type. The embodiments discussed below will refer to edge peers 110 without the distinction between edge peers of the first type and edge peers of the second type for purposes of simplicity. However, the embodiments discussed below may also operate with edge peers of a first type and edge peers of a second type.

In S440, the edge peers 110 exchange information for the video stream being relayed to/from the connected external peers according to an inter-ISP scheduling mechanism, as discussed below.

In S450, local peers 105 not selected to become edge peers 110 will connect only to local peers of the ISP A network. For example, as explained above, when new peers join the P2P network in ISP A, the new peers signal to the local tracker 115 through an announcement message. In return, the newly joined peers receive a list of potential peers. The newly joined local peers will then connect to other local peers in the ISP A network based on the received list of potential peers. In S460, the local peers 105 exchange information for the video data being relayed to/from the other local peers in the ISP A network according to an intra-ISP scheduling mechanism, which is discussed below after the inter-ISP scheduling mechanism.

Embodiments of the present invention provide a scheduling scheme at two levels, from source to individual ISP networks (via inter-ISP scheduling) and from each incoming edge peer 110 to all internal peers (via intra-ISP scheduling). Inter-ISP scheduling relates to scheduling delivery of sub-streams of, for example, a video stream being relayed from an external peer to an ISP network, where an ISP network is represented as a single peer. In other words, inter-ISP scheduling focuses on delivery of a full quality video stream to individual ISP networks. As a result, inter-ISP scheduling is only concerned with external connections and is thus implemented at edge peers 110. In contrast, intra-ISP scheduling focuses on delivery of each sub-stream from edge peers 110 to all internal peers within individual ISP networks. Intra-ISP scheduling is only responsible for managing internal connections within each ISP and is implemented by any peer with an internal parent peer. In order to achieve effective delivery for both the inter-ISP scheduling level and the intra-ISP scheduling level, a video stream is divided into a plurality of sub-streams.

Figure 4B:
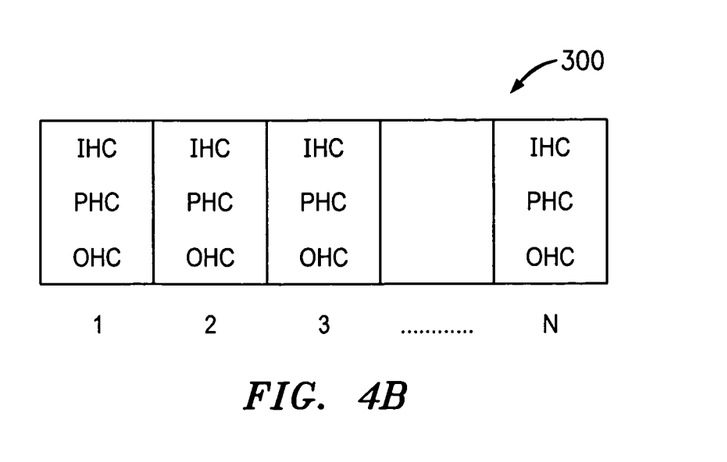
FIG. 4B illustrates the structure of a video stream within a P2P streaming application according to an embodiment of the present invention.

FIG. 4B illustrates the structure of a video stream 300 within a P2P streaming application according to an embodiment of the present invention. The video stream 300 is divided into n sub-streams, where n is any integer greater or equal to 1. Each sub-stream carries the following three counters: ISP Hop Count (IHC), Peer Hop Count (PHC), and Overall Hop Count (OHC). The IHC counter keeps track of the number of ISP networks that a substream has traversed. The PHC counter keeps track of the number of internal peers that a sub-stream has traversed within a single ISP network. The PHC counter is reset by the corresponding edge peer where a sub-stream enters an ISP network. The OHC counter keeps track of the total number of peers (regardless of their ISP) that a sub-stream has traversed.

Figure 5:
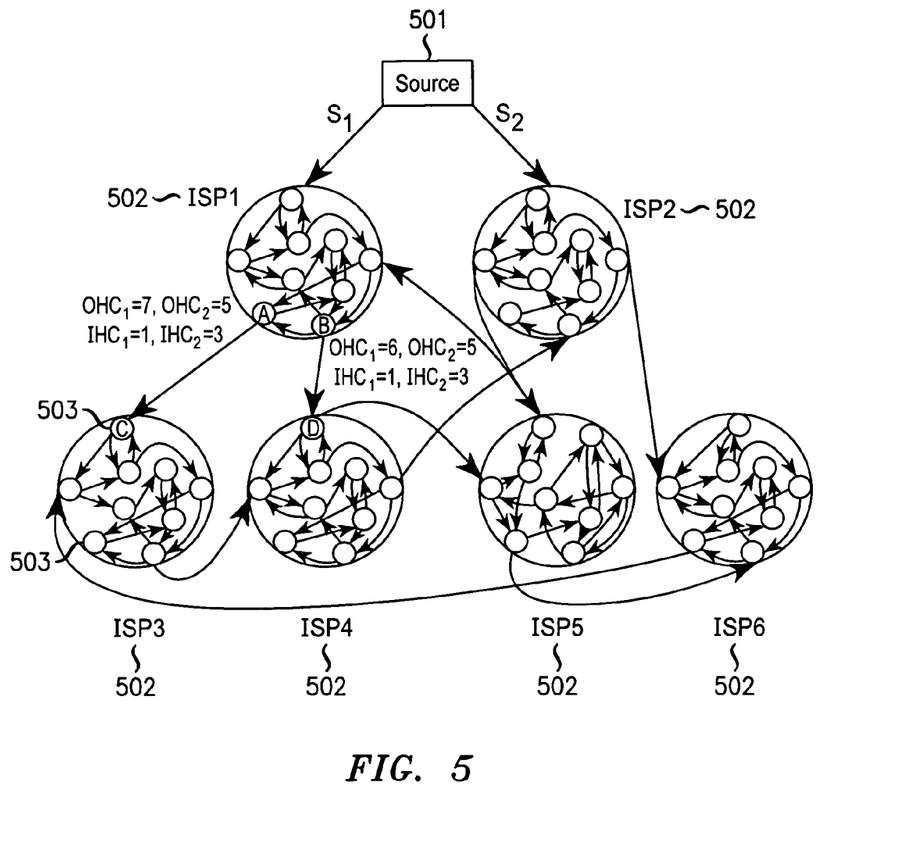
FIG. 5 illustrates an example of inter-ISP scheduling according to an embodiment of the present invention.

FIG. 5 illustrates an example of inter-ISP scheduling according to an embodiment of the present invention. FIG. 5 illustrates an example where two sub-streams, S1 and S2, are delivered to a group of six ISP networks 502 (ISP1, ISP2, ISP3, ISP4, ISP5 and ISP6) from a source 501. Each ISP network 502 as well as individual peers have incoming and outgoing degrees of 2. Each ISP network 502 includes a plurality of peers local to their respective ISP network.

Peer A in ISP1 would be considered as a parent peer of Peer C in ISP3, and Peer B in ISP1 would be considered a parent peer of Peer D in ISP4. Peer C in ISP3 and Peer D in ISP4 are edge peers 110. Referring to the parent peer A in ISP1, the two sub-streams, S1 and S2, are available to Peer C in ISP3. In this particular example, both sub-streams, S1 and S2, at Peer A illustrate their respective OHC and IHC values. For sub-stream S1, OHC=7 and IHC=1. For sub-stream S2, OHC=5 and IHC=3. The IHC for substream S1 is 1 because ISP1 receives this sub-stream directly from the source 501. On the other hand, sub-stream S2 has traversed two more ISPs (e.g., ISP 2 and ISP 5) to arrive at Peer A in ISP1. Thus, the IHC for substream 2 at Peer A is 3. Furthermore, at Peer B, both sub-streams, S1 and S2, illustrate their respective OHC and IHC values. For sub-stream S1, OHC=6 and IHC=1. For sub-stream S2, OHC=5 and IHC=3.

In order to schedule which sub-stream children peers (e.g., Peer C in ISP3 and Peer D in ISP4) pull from their respective parent peer (e.g., Peer A in ISP1 and Peer B in ISP1) to ensure that all sub-streams are delivered to each ISP, the local tracker 115 periodically or after departure of an edge peer performs a coordination by polling all edge peers 110 to obtain the available sub-streams at their corresponding external parent peers as well as the associated IHC for each sub-stream. In this case, the local tracker 115 of ISP3 would obtain identifying information for sub-streams S1 and S2 at Peer A, and IHC values for each of the sub-streams at Peer A. The local tracker 115 of ISP3 also obtains identifying information, for other sub-streams at edge peers of ISP3 other than Peer A.

After the local tracker 115 receives the information from the edge peers regarding the availability of the sub-streams at their respective parent peers and the IHC values, the local tracker 115 then coordinates the delivery of the sub-streams to the edge peers to ensure that all of the sub-streams are delivered to the ISP. The coordination mechanism of the local tracker 115 may employ any well-known means to coordinate the delivery of sub-streams to edge peers to ensure that all sub-streams are delivered to the ISP.

In contrast, intra-ISP scheduling delivers each sub-stream from its corresponding edge peer to all other peers in the ISP network. Each internal peer independently schedules different sub-streams based on the available sub-streams and the internal parent peer and PHC value at each parent peer. In other words, each internal peer considers the available sub-streams along with the PHC value at each parent and selects the sub-stream that has the minimum PHC (e.g., minimum distance from the entry point in to the ISP). If more than one sub-stream with minimum PHC are available at a particular parent peer, then the sub-stream with shorter overall hop count (OHC) is selected. This scheduling scheme is invoked periodically (e.g., once per Δ second) at each internal peer.

The Intra-ISP scheduling and the inter-ISP scheduling have been described above upon the assumption that all connection have the same bandwidth. However, both intra-scheduling and inter-scheduling may have to deal with the dynamics of peer participating (or churn) and short and long term in variation of congestion controlled bandwidth across different connections.

In another embodiment, each edge peer identifies non-designated sub-streams if the edge peer has bandwidth above a bandwidth threshold. For example, non-designated sub-streams are sub-streams that have not been assigned to a connection, which imply that the non-designated sub-streams have not been requested by their corresponding edge peer or regular peer. On the other hand, each edge peer is responsible for requesting a particular sub-stream from its external parent peer which is called a designated sub-stream. Among the non-designated sub-streams, an edge peer identifies unavailable blocks of those sub-streams in its neighborhood and requests the unavailable blocks from its external parent peer in case of extra bandwidth.

Variations of the example embodiments of the present invention are not to be regarded as a departure from the spirit and scope of the example embodiments of the invention, and all such variations as would be apparent to one skilled in the art are intended to be included within the scope of this invention.

What is claimed is:

1. A system for controlling peer-to-peer connections in a Peer-to-Peer (P2P) streaming application for individual Internet Service Provider (ISP) networks over a localized overlay, the system comprising:

a tracker local to a first ISP network configured to select edge peers among local peers of the first ISP network, wherein the selected edge peers have external connections to external peers located in ISP networks outside the first ISP network, the external connections configured to transfer sub-streams to or from the first ISP network, and the local peers not selected as edge peers have internal connections to other local peers within the first ISP network to transfer the sub-streams over the localized overlay; and a session-level tracker external to the first ISP network and the ISP networks hosting the external peers, the session-level tracker configured to provide a list of potential external peers to the edge peers in response to an announce message therefrom such that the local peers do not receive the list of potential external peers and the edge peers are configured to form the external connections by selecting the external peers from the list of potential external peers, the session-level tracker reachable by each of the edge peers without traversing over one of the external peers.

2. The system of claim 1, wherein the tracker is configured to select the edge peers based on bandwidth.

3. The system of claim 1, wherein the tracker is further configured to select an edge peer when an existing edge peer departs from the P2P streaming application.

4. The system of claim 1, wherein the tracker is configured to select an edge peer based on whether a number of edge peers is below a first threshold.

5. The system of claim 1, wherein the tracker is configured to select edge peers of a first type and edge peers of a second type, wherein the edge peers of the first type are configured to manage incoming external connections and the edge peers of the second type are configured to manage outgoing external connections.

6. The system of claim 1, wherein the session-level tracker is configured to establish the external connections in response to the announce message from the edge peers, wherein the edge peers are the only local peers visible to external peers outside the first ISP network.

7. The system of claim 6, wherein the session-level tracker is further configured to provide a list of local trackers.

8. The system of claim 1, wherein the tracker is further configured to schedule the transfer of the sub-streams via the external connections between the external peers and the edge peers of the first ISP network.

9. The system of claim 8, wherein the tracker is configured to schedules the transfer of the sub-streams based on available sub-streams at the external peers and an ISP Hop Count (ICH) for each sub-stream, the ICH indicating a number of ISP networks that a sub-stream traversed.

10. The system of claim 1, wherein the local peers of the first ISP network schedule the transfer of the sub-streams via the internal connections based on available sub-streams at internal parent peers and a Peer Hop Count (PHC), the PHC indicating a number of internal peers that a respective sub-stream traversed within a single ISP network.

11. The system of claim 10, wherein the local peers schedule the transfer of sub-streams which have a minimum PHC count value.

12. The system of claim 1, wherein each sub-stream includes: (1) ISP Hop Count (ICH) indicating a number of ISP networks that a respective sub-stream traversed, (2) Peer Hop Count (PHC) indicating a number of internal peers that a respective sub-stream traversed within a single ISP network, and (3) Overall Hop Count (OHC) indicating a total number of peers that a respective sub-stream traversed regardless of an ISP network.

13. A method for controlling peer-to-peer connections in a Peer-to-Peer (P2P) streaming application for individual Internet Service Provider (ISP) networks over a localized overlay, the method comprising:
   selecting, by a tracker local to a first ISP network, edge peers among local peers of the first ISP network, wherein the selected edge peers have external connections to external peers located in ISP networks outside the first ISP network, the external connections configured to transfer sub-streams to or from the first ISP network, and the local peers not selected as edge peers have internal connections to other local peers within the first ISP network to transfer the sub-streams over the localized overlay; and
   providing, by a session-level tracker external to the first ISP network and the ISP networks hosting the external peers, a list of potential external peers to the edge peers in response to an announce message therefrom such that the local peers do not receive the list of potential external peers and the edge peers are configured to form the external connections by selecting the external peers from the list of potential external peers, the session-level tracker reachable by each of the edge peers without traversing over one of the external peers.

14. The method of claim 13, wherein the selecting step selects the edge peers based on bandwidth.

15. The method of claim 13, wherein the selecting step selects an edge peer when an existing edge peer departs from the P2P streaming application.

16. The method of claim 13, wherein the selecting step selects an edge peer based on whether a number of edge peers is below a first threshold.

17. The method of claim 13, wherein the selecting step selects edge peers of a first type and edge peers of a second type, wherein the edge peers of the first type manage incoming external connections and the edge peers of the second type manage outgoing external connections.

18. The method of claim 13, further comprising:
   establishing, by the session-level tracker, the external connections in response to the announce message from the edge peers, wherein the edge peers are the only local peers visible to external peers outside the first ISP network.

19. The method of claim 13, further comprising:
   scheduling, by the tracker, the transfer of the sub-streams via the external connections between the external peers and the edge peers of the first ISP network.

20. The method of claim 19, wherein the scheduling step schedules the transfer of the sub-streams based on available sub-streams at the external peers and an ISP Hop Count (ICH) for each sub-stream, the ICH indicating a number of ISP networks that a sub-stream traversed.

* * * * *